US011326784B2

(12) United States Patent
Manara et al.

(10) Patent No.: US 11,326,784 B2
(45) Date of Patent: May 10, 2022

(54) MOUNTING ASSEMBLY FOR A DOOR OF A HOME APPLIANCE AND METHOD OF USE

(71) Applicant: WHIRLPOOL CORPORATION, Benton Harbor, MI (US)

(72) Inventors: Paulo Henrique Alves Manara, Joinville (BR); Ledimara Mascarello, Joinville (BR); Vinicius Simm, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 381 days.

(21) Appl. No.: 16/456,544

(22) Filed: Jun. 28, 2019

(65) Prior Publication Data

US 2020/0408420 A1 Dec. 31, 2020

(51) Int. Cl.
*F24C 15/02* (2006.01)
*A21B 3/02* (2006.01)

(52) U.S. Cl.
CPC .............. *F24C 15/023* (2013.01); *A21B 3/02* (2013.01)

(58) Field of Classification Search
CPC ...... F24C 15/02; F24C 15/028; F24C 15/023; E05Y 2900/308; E05Y 2900/30; E05Y 2600/626; E05D 15/54; E05D 7/1061; E05D 7/1066
USPC .................. 126/190, 194; 16/257–259, 380
See application file for complete search history.

(56) References Cited

U.S. PATENT DOCUMENTS

| 3,059,271 | A | * | 10/1962 | Erickson | ............... E05D 7/1061 |
| | | | | | 16/261 |
| 3,409,004 | A | * | 11/1968 | Rehberg | ............... F24C 15/021 |
| | | | | | 126/190 |
| 6,561,180 | B1 | | 5/2003 | Austin et al. | |
| 7,111,363 | B2 | | 9/2006 | Lee et al. | |
| 8,510,913 | B2 | | 8/2013 | Kim | |
| 9,115,903 | B2 | | 8/2015 | Lim et al. | |

FOREIGN PATENT DOCUMENTS

| EP | 2468993 A1 | 6/2012 |
| EP | 2738329 A1 | 6/2014 |
| EP | 3128110 A1 | 2/2017 |
| FR | 2575512 B3 | 7/1987 |
| FR | 2934671 B1 | 9/2010 |
| GB | 2410059 B | 7/2005 |
| KR | 20000034540 A | 6/2000 |

* cited by examiner

*Primary Examiner* — Nivek K Shirsat
(74) *Attorney, Agent, or Firm* — Price Heneveld LLP (57) ABSTRACT

A home appliance includes a door coupled with a cabinet of the home appliance and moveable about a vertical axis between open and closed positions. A lower hinge assembly moveably couples a lower portion of the door with the cabinet. A mounting assembly is configured to support an upper portion of the door relative to the cabinet until the upper portion of the door is coupled with the cabinet and includes a first bracket supporting a pivot pin and a second bracket including a slot configured to receive the pivot pin therein. When the lower portion of the door is coupled to the cabinet by the lower hinge assembly and the pivot pin is received within the slot, the mounting assembly is configured to maintain the upper portion of the door in vertical alignment with the lower portion along the vertical axis.

18 Claims, 11 Drawing Sheets

MOUNTING ASSEMBLY FOR A DOOR OF A HOME APPLIANCE AND METHOD OF USE

BACKGROUND OF THE DISCLOSURE

The present disclosure generally relates to a mounting assembly for a door of a home appliance, and more specifically, to a mounting assembly for an oven door.

SUMMARY OF THE DISCLOSURE

According to an aspect of the present disclosure, a home appliance includes a cabinet defining an interior and having an access opening to a chamber disposed within the interior and a door coupled with the cabinet to selectively provide access to the chamber. A lower hinge assembly moveably couples a lower portion of the door with the cabinet for movement of the door about a vertical axis between open and closed positions. A mounting assembly is configured to support an upper portion of the door relative to the cabinet until the upper portion of the door is coupled with the cabinet and includes a first bracket coupled with one of the cabinet and the door and supporting a pivot pin and a second bracket mounted to the other of the cabinet and the door, wherein the second bracket includes a slot configured to receive the pivot pin therein. When the lower portion of the door is coupled to the cabinet by the lower hinge assembly and the pivot pin is received within the slot, the mounting assembly is configured to maintain the upper portion of the door in vertical alignment with the lower portion along the vertical axis until the upper portion of the door is coupled with the cabinet.

According to another aspect of the present disclosure, a method of coupling a door to a home appliance for movement about a vertical axis between open and closed positions is provided. The method includes coupling a lower portion of a door to a cabinet of the home appliance with a lower hinge assembly, and wherein one of the cabinet and the upper portion of the door comprises a first bracket supporting a pivot pin. A second bracket coupled to the other of the cabinet and the upper portion of the door is aligned with the pivot pin. The upper portion of the door is moved with respect to the cabinet to position the pivot pin within a slot formed in the second bracket. The second bracket is configured such that when the pivot pin is positioned within the slot, the upper portion of the door is maintained in vertical alignment with the lower portion of the door until the upper portion of the door is coupled with the cabinet.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of apparatus components and method steps relating to a mounting assembly that supports the door of a home appliance, such as a cooking oven, in a vertical position until coupling of the door to a cabinet of the home appliance is completed. Home appliances often include one or more doors to provide access to chambers or compartments within the interior of the home appliance. Typically, these doors are coupled to the cabinet of the home appliance for movement about a vertical axis or a horizontal axis during opening and closing of the door. As used herein, a door of a home appliance is considered to open and close about a vertical axis when the door is pivoted to the left or the right of a user of the home appliance during opening of the door, even if the vertical axis that the door is pivoted about is not orthogonal to the surface upon which the home appliance rests. As used herein, a door of a home appliance is considered to open and close about a horizontal axis when the door is pivoted upward or downward by the user and remains generally in front of the user during opening and closing of the door. During the manufacturing process of the home appliance, it can be challenging to couple a vertical axis door to the home appliance. For example, it can often take more than one individual or additional support equipment to hold the door in an upright, vertical position in order to complete the process of coupling both the upper and lower portions of the door to the cabinet during manufacturing of the home appliance. The use of additional personnel or equipment during the manufacturing process can increase manufacturing time and costs. The assembly process can further be complicated when the home appliance is configured such that the components for coupling the upper portion of the door to the cabinet are not accessible from above.

Aspects of the present disclosure relate to a mounting assembly and method of use that facilitate maintaining a vertical axis door in an upright, vertical position during the manufacturing process without the use of an additional individual or additional equipment to hold the door while the door is coupled to the cabinet of the home appliance. As used herein with respect to the door, a door is considered to be coupled to the cabinet when it is secured with respect to the cabinet in an intended use condition and will not separate from the cabinet during normal, intended use. The mounting assembly and method of use of the present disclosure is configured to allow the door to be mounted to the cabinet and to be self-supported relative to the cabinet prior to completing the process of coupling the door with the cabinet. The mounting assembly is configured to self-support the door relative to the cabinet, which can free up an individual's hands to complete the process of coupling the door to the cabinet. Aspects of the present disclosure are also suitable for use with home appliances in which the components for coupling the door to the cabinet cannot be accessed from above, such as in the case of the exemplary home appliance 10 of FIGS. 1-2.

Accordingly, the apparatus components and method steps of the present disclosure have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
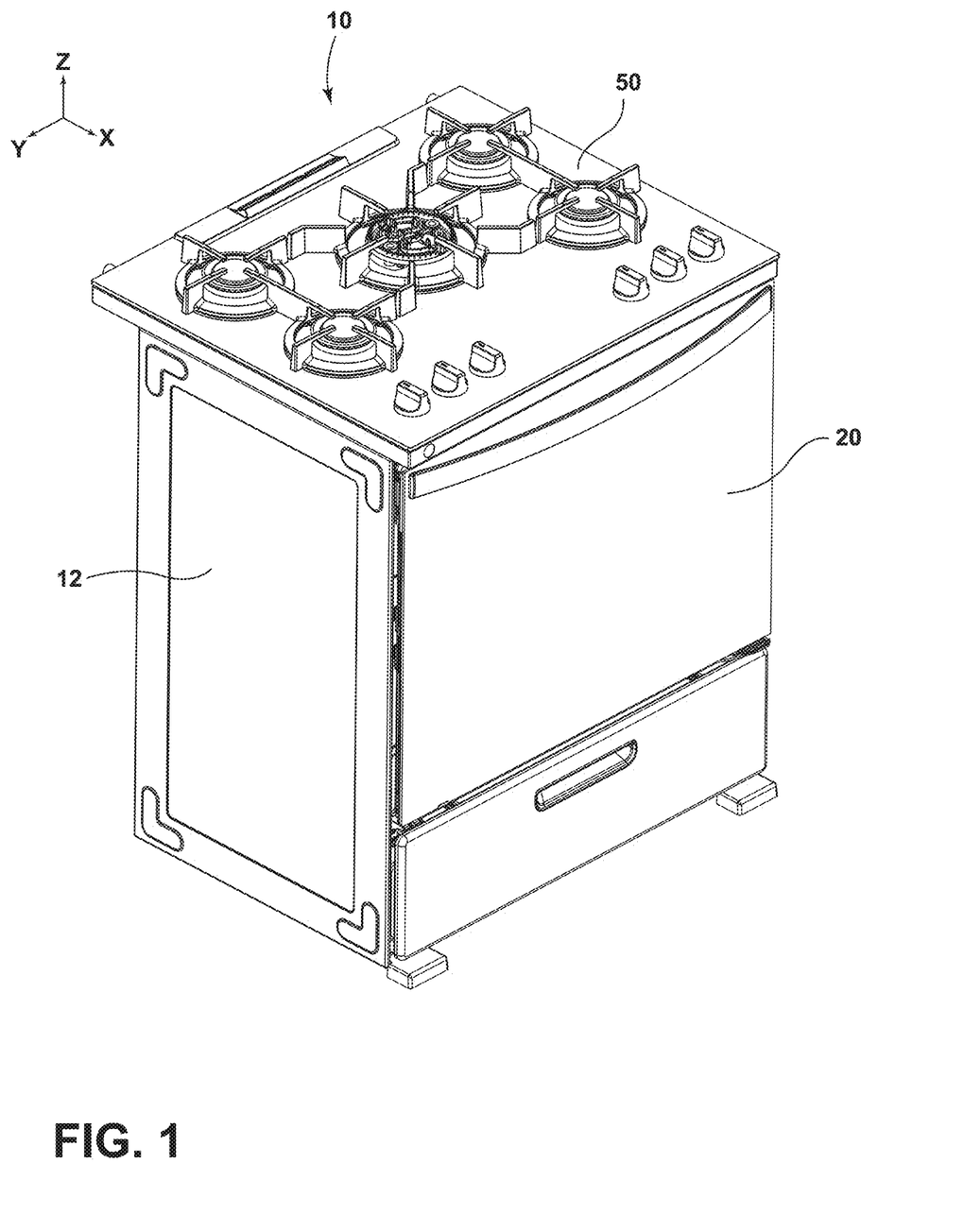
FIG. 1 is a top perspective view of a home appliance having a door in a closed position, according to an aspect of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. The term "lateral" is used to refer to orientations along a YZ plane of the home appliance of FIG. 1 (e.g., left and right with respect to the home appliance) and the term "longitudinal" is used to refer to orientations along an XZ plane of the home appliance of FIG. 1 (e.g., rearward and frontward with respect to the home appliance). It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The term "vertical" as used herein encompasses axes and planes that generally extend at a right angle with respect to a horizontal surface upon which the home appliance of FIG. 1 rests, unless otherwise noted. It is understood that a vertical axis or plane may vary from a right angle due to natural variations in the environment in which the home appliance is situated, installation conditions, user preferences, component tolerances, and the like. The term "horizontal" as used herein encompasses axes and planes that generally extend parallel to a horizontal plane defined by the horizontal surface upon which the home appliance of FIG. 1 rests, unless otherwise specifically noted. It is understood that a horizontal axis or plane may vary due to natural variations in the environment in which the home appliance is situated, installation conditions, user preferences, component tolerances, and the like.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
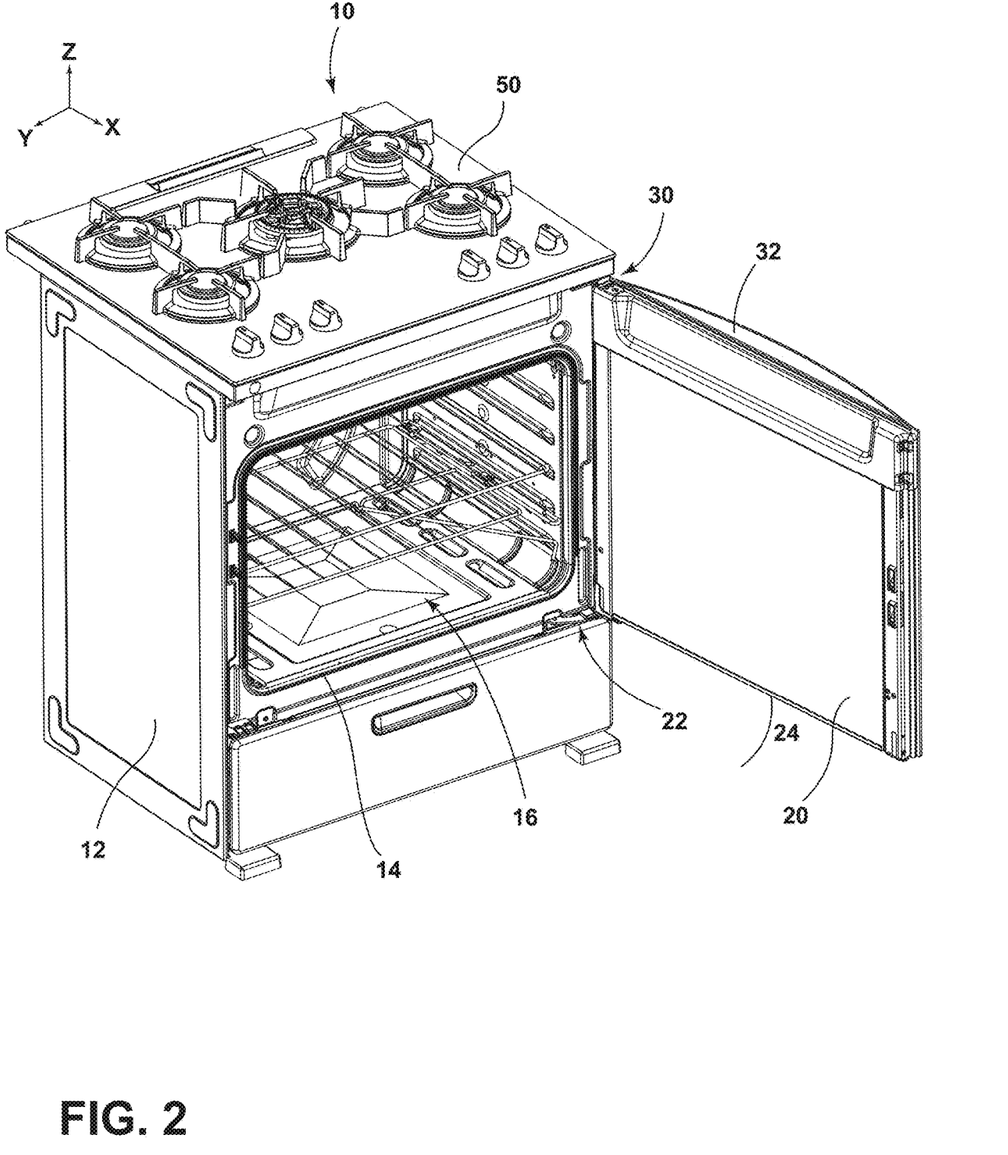
FIG. 2 is a top perspective view of the home appliance of FIG. 1 with the door in an open position, according to an aspect of the present disclosure.

Referring to FIGS. 1-11, reference numeral 10 generally designates a home appliance in the form of a cooking oven. The home appliance 10 includes a cabinet 12 defining an interior and having an access opening 14 to a chamber 16 disposed within the interior. A door 20 is coupled with the cabinet 12 to selectively provide access to the chamber 16. A lower hinge assembly 22 moveably couples a lower portion 24 of the door 20 with the cabinet 12 for movement of the door 20 about a vertical axis between a closed position (FIG. 1) and an open position (FIG. 2). A mounting assembly 30 is configured to support an upper portion 32 of the door 20 relative to the cabinet 12 until the upper portion 32 of the door 20 is coupled with the cabinet 12. The mounting assembly 30 includes a first bracket 40 and a second bracket 42. The first bracket 40 can be coupled with the cabinet 12 and supports a pivot pin 46. The second bracket 42 can be mounted to the upper portion 32 of the door 20 and includes a slot 48 configured to receive the pivot pin 46 therein. When the lower portion 24 of the door 20 is coupled to the cabinet 12 by the lower hinge assembly 22, the mounting assembly 30 is configured to maintain the upper portion 32 of the door 20 in vertical alignment with the lower portion 24 along the vertical axis until the upper portion 32 of the door 20 is coupled with the cabinet 12.

While aspects of the present are discussed in the context of a cooking oven, it is within the scope of the present disclosure for aspects of the present disclosure to be utilized in a variety of home appliances, non-limiting examples of which include a microwave oven, a refrigerator, a freezer, and a laundry treating appliance, such as a clothes dryer or clothes washer, for example. When the home appliance 10 is in the form of a cooking oven, the cabinet 12 may be a housing including a chassis and/or frame which defines the interior and which encloses components typically found in a conventional cooking oven, such as electrical components, heating elements, gas lines, valves, control units, burner elements, broiler elements, and the like. Such components will not be described further herein except where necessary for a complete understanding of the aspects of the present disclosure. When the home appliance 10 is in the form of a cooking oven, the cooking oven 10 can include a cooktop 50 including one or more burner elements and actuators, the specific design of which is not germane to the aspects of the present disclosure and which may vary depending the type of home appliance. The cooktop 50 can be a gas powered cooktop whereby the burner elements are configured to provide a heat source by burning a gas fuel source or an electric powered cooktop whereby the burner elements include resistive heating elements that are powered by a flow of electricity thereto. In the context of a cooking oven 10, the chamber 16 can be a cooking chamber and gas and/or electric heating elements (not shown) can be provided within the cabinet 12 for providing heat to the cooking chamber 16 during a cooking cycle.

Figure 3:
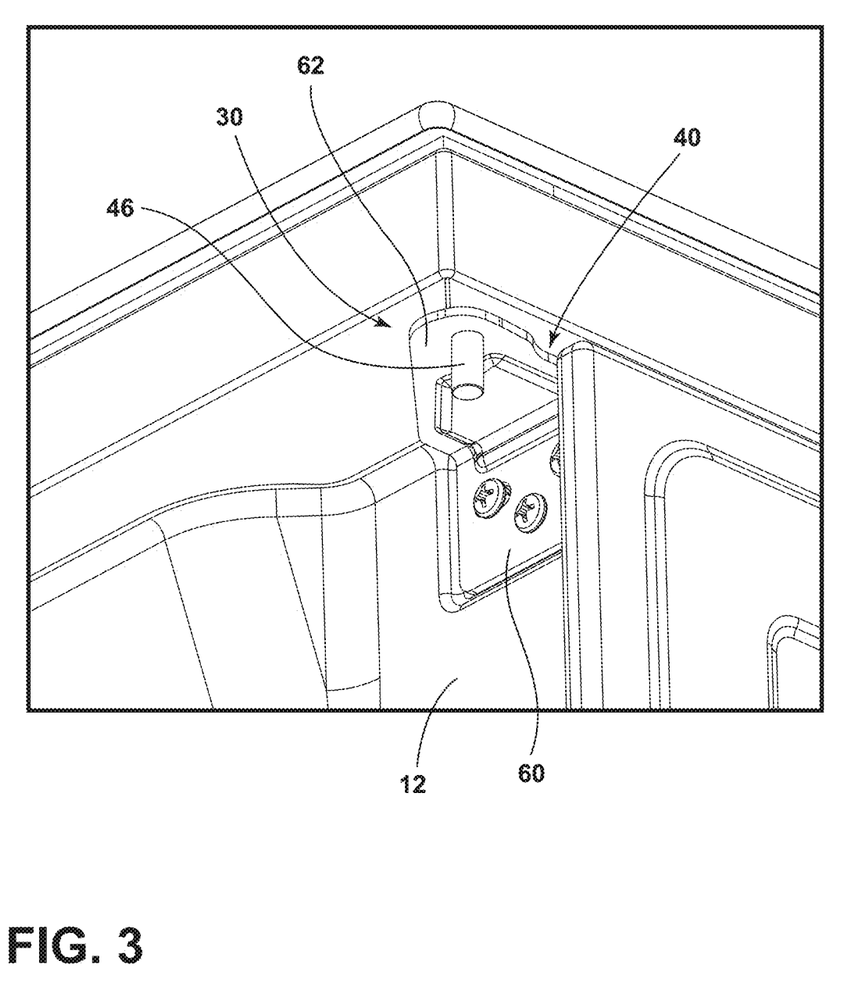
FIG. 3 is an enlarged perspective view of a portion of a mounting assembly coupled to the home appliance of FIG. 1, according to an aspect of the present disclosure.
Figure 4:
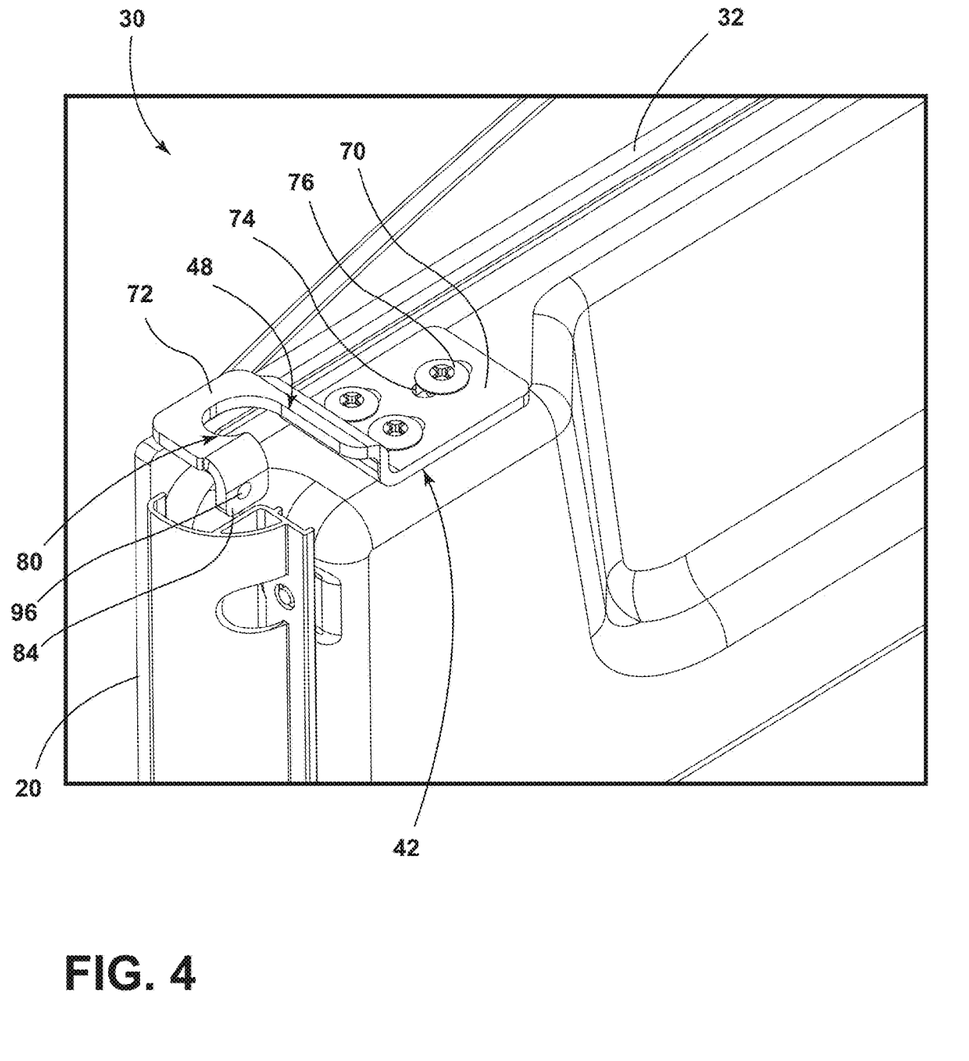
FIG. 4 is an enlarged perspective view of a portion of a mounting assembly coupled to the home appliance of FIG. 1, according to an aspect of the present disclosure.
Figure 5:
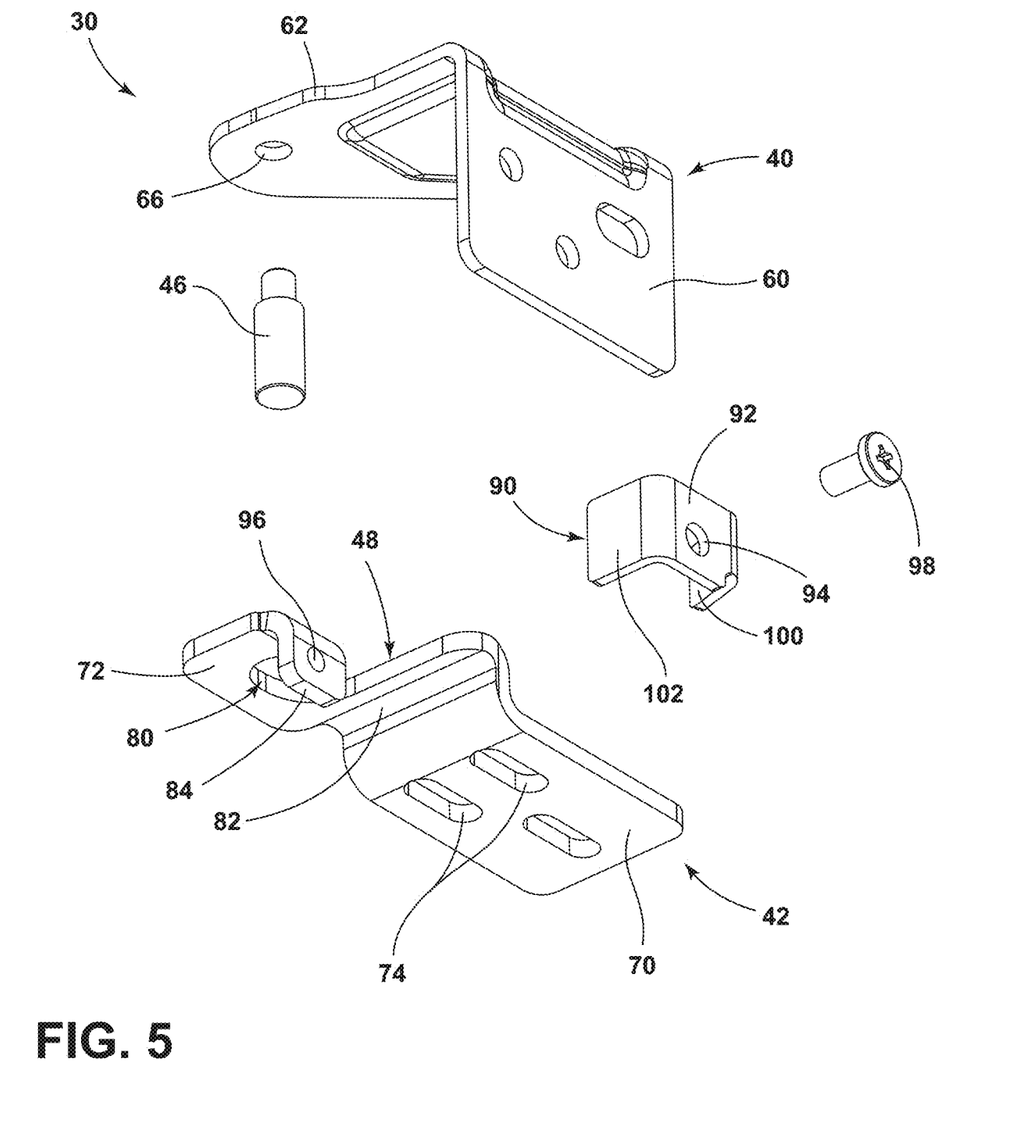
FIG. 5 is an exploded lower perspective view of a mounting assembly, according to an aspect of the present disclosure.
Figure 6:
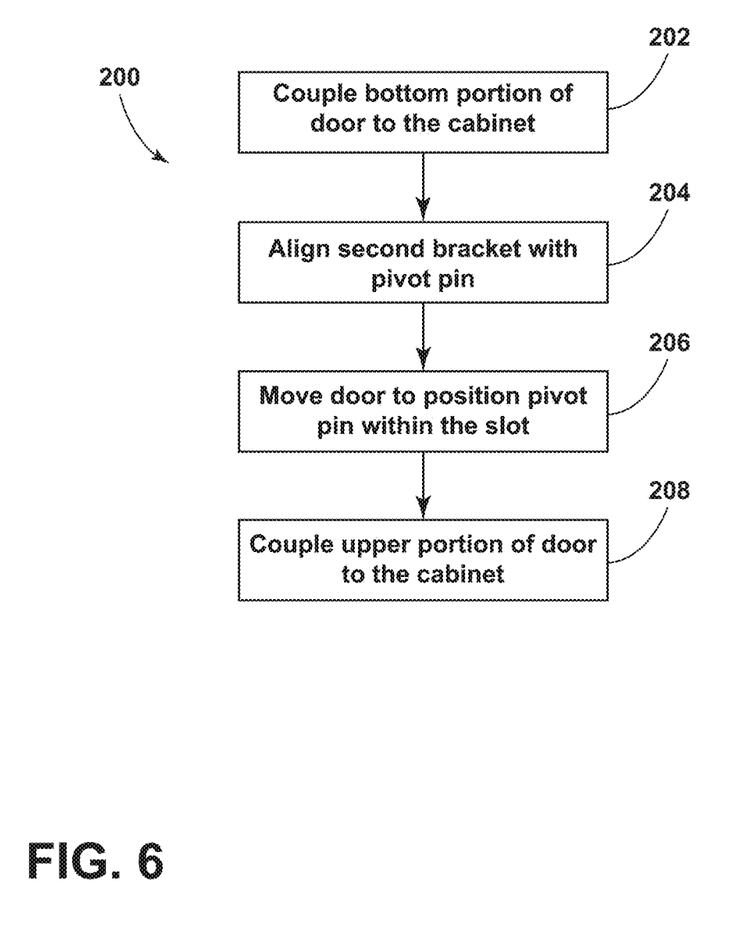
FIG. 6 is a flow chart illustrating a method of coupling a door to a home appliance, according to an aspect of the present disclosure.
Figure 7:
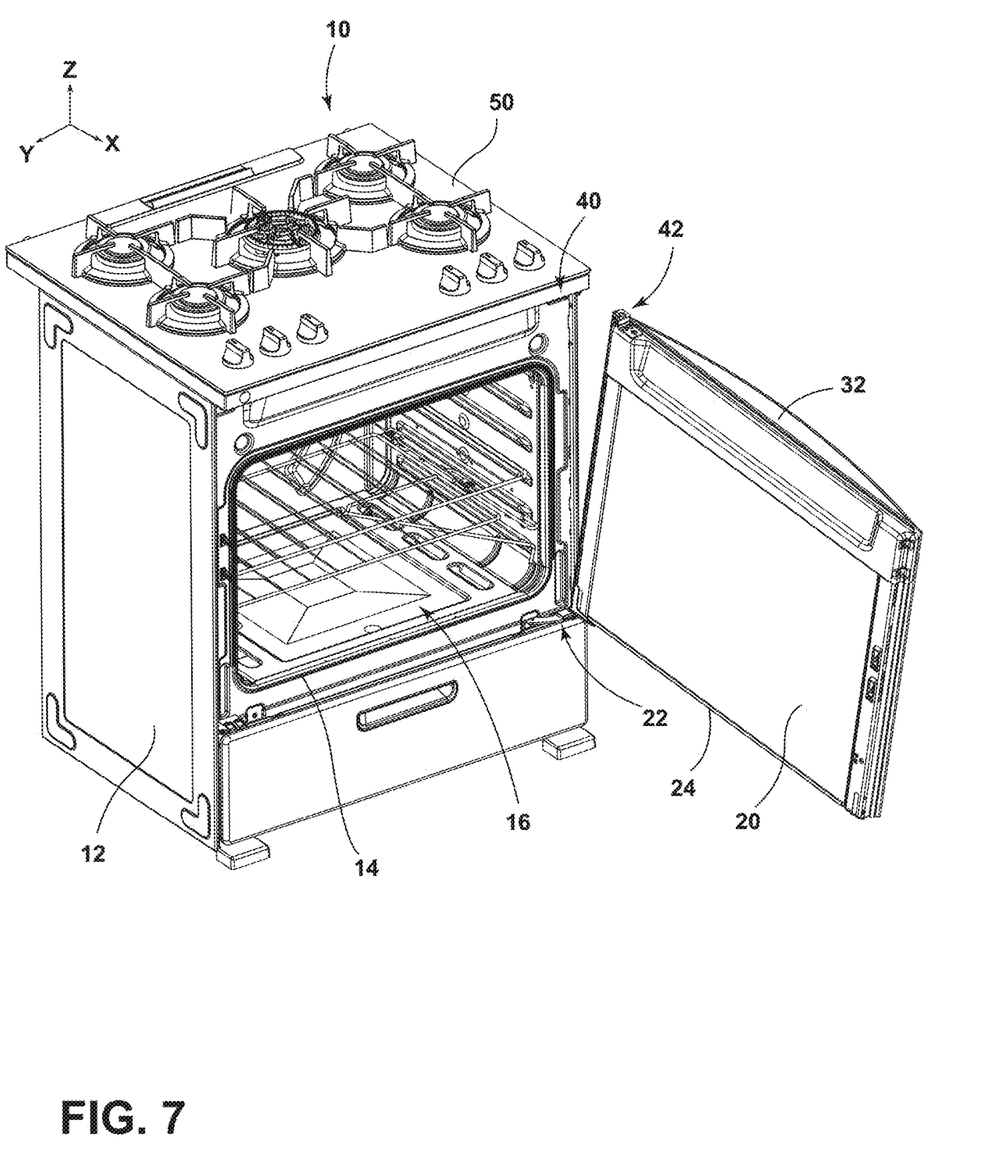
FIG. 7 is a perspective view of a partially assembled home appliance, according to an aspect of the present disclosure.
Figure 8:
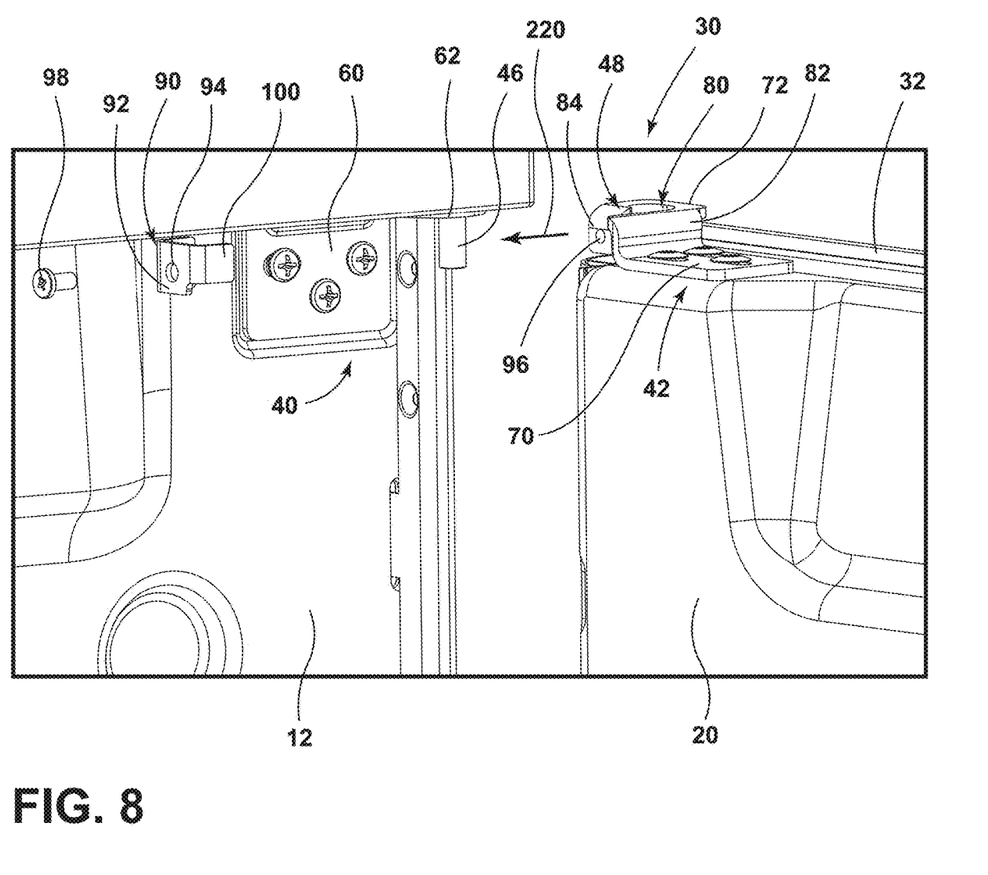
FIG. 8 is an enlarged partial perspective view of a portion of the home appliance of FIG. 7 illustrating an upper portion of a door being moved into position for coupling the door to the home appliance, according to an aspect of the present disclosure.

With reference to FIGS. 3-5, the first bracket 40 can be coupled to the cabinet 12 by a first plate 60 and includes a second plate 62 extending from a distal end of the first plate 60. The second plate 62 is configured to support the pivot pin 46 in vertical alignment with the lower hinge assembly 22. The pivot pin 46 can include an optional bushing to facilitate movement of components about the pivot pin 46 during assembly of the door 20 and movement of the door 20 between the open and closed positions once the door 20 is coupled with the cabinet 12. The second plate 62 can optionally include an aperture 66 configured to receive an upper portion of the pivot pin 46 therein. The pivot pin 46 can be coupled with the second plate 62 using any suitable mechanical and/or non-mechanical fasteners, non-limiting examples of which include screws, bolts, snap-fit connectors, interference fit connectors, welds, adhesives, and the like. In another example, the pivot pin 46 may be integrally formed with the second plate 62 or captured between the second plate 62 and the cabinet 12. The first and/or second plates 60 and 62 can be coupled with the cabinet 12 using any suitable mechanical and/or non-mechanical fasteners, non-limiting examples of which include screws, bolts, snap-fit connectors, interference fit connectors, welds, adhesives, and the like.

The second bracket 42 can include a first portion 70 and a second portion 72. The first portion 70 can be configured to couple the second bracket 42 to the door 20 and can include apertures 74 for coupling the first portion 70 to the door 20 with one or more mechanical fasteners 76. In one example, the apertures 74 can be apertures, which allow for horizontal adjustment of the second bracket 42 with respect to the door 20. The second portion 72 includes the slot 48 formed therein and an optional channel 80 extending orthogonal to the slot 48. The slot 48 and channel 80 can provide the second portion 72 with a general "hook" shape that is configured to be "hooked" onto the pivot pin 46 to maintain the door 20 in the upright, vertical position during the manufacturing process, as is discussed in more detail below. The second portion 72 can optionally be connected with the first portion 70 by a leg 82 that vertically offsets the second portion 72 from the first portion 70. The second bracket 42 can also include a third portion 84 that depends downward from the second portion 72, adjacent the slot 48.

The mounting assembly 30 can also include a third bracket 90 that is configured to be coupled with the third portion 84 of the second bracket 42 after the pivot pin 46 is positioned within the slot 48 to prevent the pivot pin 46 from withdrawing from the slot 48. The third bracket 90 can include a first leg 92 having an aperture 94 configured to align with an aperture 96 in the third portion 84 for coupling thereto by a mechanical fastener 98. The third bracket 90 can be coupled to the second bracket 42 using any suitable mechanical and/or non-mechanical fastener, non-limiting examples of which include screws, bolts, snap-fit connectors, interference fit connectors, welds, adhesives, and the like. The third bracket 90 includes a second leg 100 extending from a distal end of the first leg 92 and an optional third leg 102, opposite the second leg 100.

With reference to FIGS. 6-11, a method 200 of using a mounting assembly to facilitate coupling a door to a home appliance during a manufacturing process of the home appliance according to aspects of the present disclosure is illustrated. The method 200 can include connecting the lower portion 24 of the door 20 to the cabinet 12 with the lower hinge assembly 22 (202). Connecting the lower portion 24 of the door 20 can include connecting the lower portion 24 of the door 20 with the lower hinge assembly 22 such that coupling of the lower portion 24 to the cabinet 12 is completed (i.e., the lower portion 24 of the door 20 will not separate from the cabinet 12 during opening and closing of the door 20 during intended use) or the connecting step 202 can include connecting the lower portion 24 of the door 20 with the cabinet 12 only to the extent necessary to complete the process of coupling the upper portion 32 of the door 20 with the cabinet 12 and additional steps may be completed at a later stage in the manufacturing process to complete the coupling of the lower portion 24 of the door 20 to the cabinet 12. The lower hinge assembly 22 can be any suitable hinge assembly for moveably coupling the lower portion 24 of the door 20 with the cabinet 12 for movement between open and closed positions about a vertical axis. For example, the lower hinge assembly 22 can include a pivot pin coupled to the cabinet 12 and received by a suitable component coupled to the lower portion 24 of the door 20 or vice versa to allow for opening and closing of the door 20. In another example, the lower hinge assembly 22 can include a hinge assembly as described in Applicant's U.S. patent application Ser. No. 16/456,496, now U.S. Pat. No. 11,060,333, entitled "Hinge Assembly for a Home Appliance and Method of Assembling," the contents of which are incorporated herein by reference in their entirety. When the first bracket 40 is not already coupled with the cabinet 12, the method 200 can optionally include coupling the first bracket 40 with the cabinet 12 prior to the step 202 of coupling the lower portion 24 of the door 20 with the cabinet 12 by the lower hinge assembly 22.

As illustrated in FIGS. 6-9, at step 204, the door 20 can be pivoted about the lower hinge assembly 22 and the upper portion 32 of the door 20 can be moved relative to the cabinet 12 to bring the second bracket 42 into alignment with the pivot pin 46 on the first bracket 40. Preferably the second bracket 42 is coupled to the upper portion 32 of the door 20 prior to steps 202 and 204. At step 206, the upper portion 32 of the door 20 is moved generally laterally, as illustrated by arrow 220, to position the pivot pin 46 within the slot 48. Once the pivot pin 46 is positioned within the slot 48 (FIG. 9), the door 20 can be released and the door 20 will be self-supported at the upper portion 32 by the mounting assembly 30 and the mounting assembly 30 will maintain the upper portion 32 in vertical alignment with the lower portion 24 along the vertical axis until the process of coupling the upper portion 32 with the cabinet 12 is completed. In one aspect of the present disclosure, this self-supporting aspect of the mounting assembly 30 can facilitate completing the process of coupling the door 20 to the cabinet 12 during manufacturing without the use of a second individual or separate equipment to support and maintain the door 20 in an upright, vertical position until the coupling process is completed.

Figure 9:
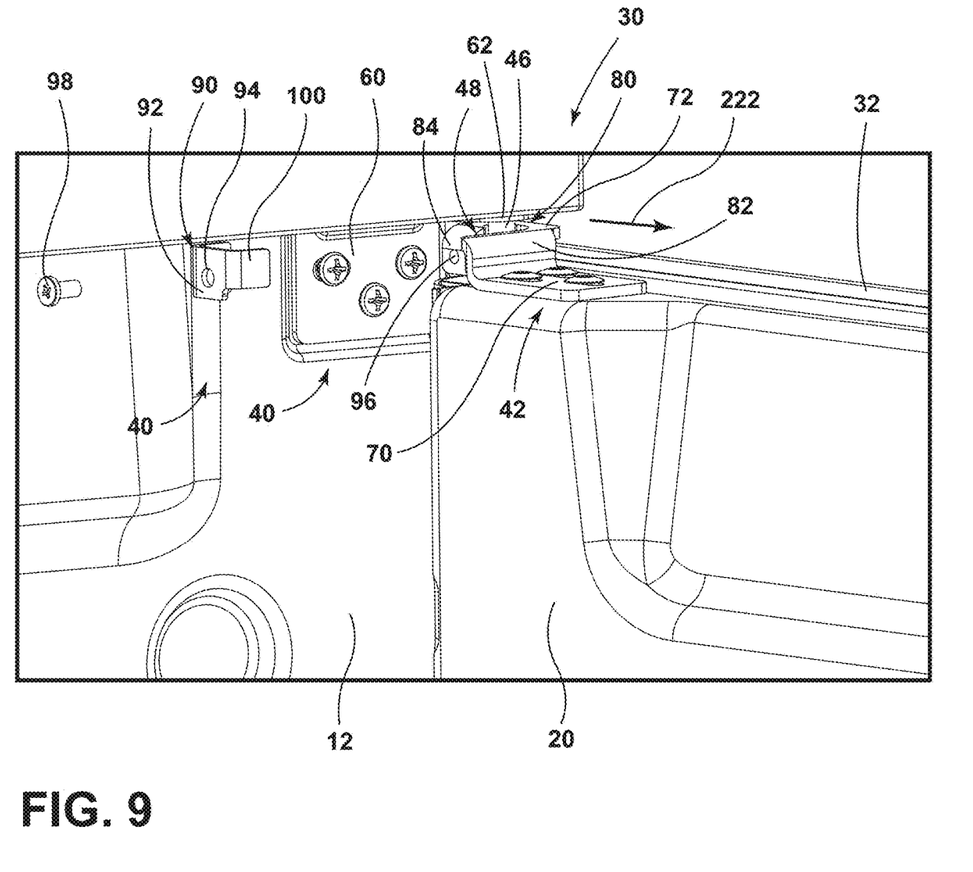
FIG. 9 is an enlarged partial perspective view of a portion of the home appliance of FIG. 7 illustrating an upper portion of a door being supported by mounting assembly prior to coupling the door to the home appliance, according to an aspect of the present disclosure.

Optionally, after the pivot pin 46 is positioned within the slot 48, the upper portion 32 of the door 20 can be shifted longitudinally forward with respect to the cabinet 12 to move the pivot pin 46 into the channel 80, as illustrated by arrow 222 in FIG. 9. The channel 80 can be configured to "hook" the pivot pin 46 within the second bracket 42 and may provide additional stability to maintaining the upper portion 32 of the door 20 in vertical alignment with the lower portion 24 of the door 20 until the coupling process is completed. A depth of the channel 80 can be selected to provide the desired stability based on any number of factors, non-limiting examples of which include the dimensions of the door 20 and a weight of the door 20. At any point prior to, during, or after steps 202, 204, 206, and/or 208 the position of the second bracket 42 on the upper portion 32 of the door 20 can be adjusted by virtue of the obrounds 74 to facilitate alignment of the slot 48 and the pivot pin 46.

Figure 10:
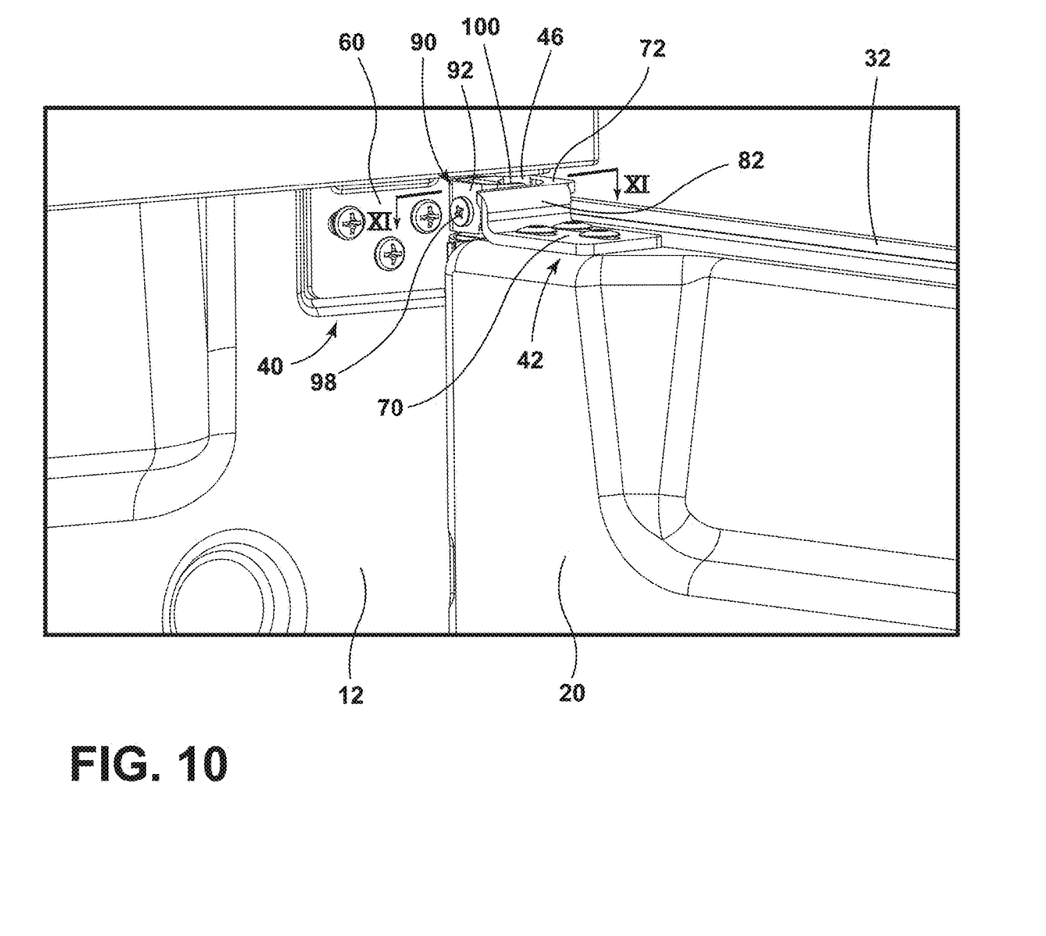
FIG. 10 is an enlarged partial perspective view of the home appliance of FIG. 7 illustrating an upper portion of a door being coupled to the home appliance, according to an aspect of the present disclosure.
Figure 11:
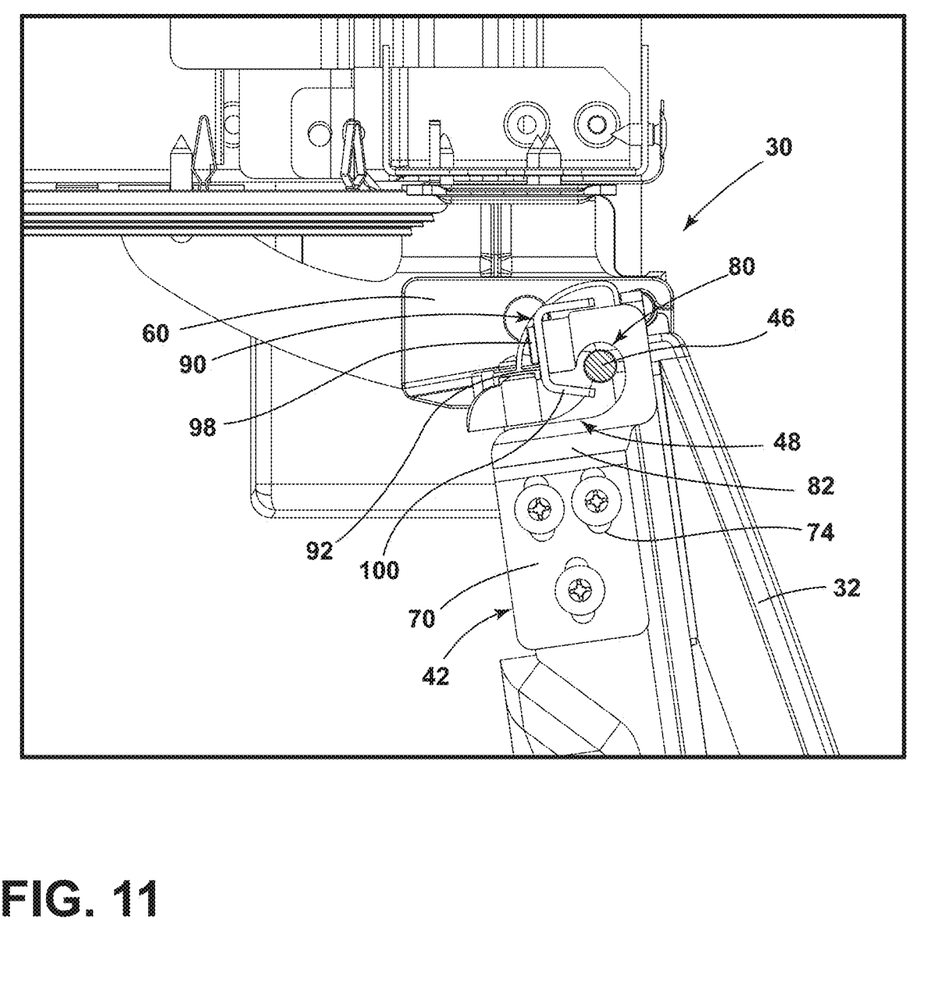
FIG. 11 is a cross-sectional view taken along the line XI-XI in FIG. 10, according to an aspect of the present disclosure.

With reference to FIGS. 6 and 9-11, at 208 the upper portion 32 of the door 20 can be coupled to the cabinet 12 using the third bracket 90. Once the pivot pin 46 is positioned within the slot 48, and optionally positioned within the channel 80, the third bracket 90 can be aligned with the second bracket 42 such that the second leg 100 projects into the slot 48 and the first leg 92 can be coupled with the third portion 84 of the second bracket 42 by the fastener 98. Once the third bracket 90 is coupled with the second bracket 42, the pivot pin 46 is prevented from being withdrawn from the slot 48, and the upper portion 32 of the door 20 may now be considered coupled with the cabinet 12 (FIGS. 10-11). The second bracket 42 and third bracket 90 are configured to allow for relative rotation of the second and third brackets 42 and 90 and the pivot pin 46 such that, the second bracket 42, third bracket 90, and pivot pin 46 provide an upper hinge assembly about which the upper portion 32 of the door 20 is moved during opening and closing of the door 20 during intended use of the cooking oven 10. The process of coupling the door to the home appliance can be considered completed when the door 20 is coupled to the cabinet 12 by both the upper hinge assembly (formed by coupling the third bracket 90 with the second bracket 42 after the pivot pin 46 has been received within the second bracket 42) and the lower hinge assembly 22 such that the door is capable of moving between the open and closed positions without either the lower or the upper portions 24, 32 of the door 20 separating from the cabinet 12. It is understood that additional assembly steps may be associated with either or both the lower and upper hinge assemblies after the door 20 is fully coupled with the cabinet 12 at both the lower and upper portions 24, 32, such as for example adding aesthetic trim or cover components or lubricating fluid.

The shape and dimensions of the second leg 100 can be configured as desired to restrict relative movement of the second bracket 42 and the pivot pin 46 such that the pivot pin 46 is maintained or trapped within desired portions of the slot 48 and/or channel 80. For example, as illustrated in FIG. 11, the second leg 100 can be configured to extend into the slot 48 and restrict or trap the pivot pin 46 predominately within the channel 80, thereby limiting the range of lateral and longitudinal movement of the upper portion 32 of the door 20 with respect to the cabinet 12, while still allowing for the second bracket 42 to rotate about the pivot pin 46 during opening and closing of the door 20. A length and/or an angle of the second leg 100 with respect to the first leg 92 can be selected to restrict the relative position of the pivot pin 46 within a predetermined portion of the slot 48 and/or channel 80, thereby limiting movement of the upper portion 32 of the door 20 with respect to the cabinet 12 and preventing the upper portion 32 of the door 20 from becoming uncoupled from the cabinet 12.

At any point prior to, during, or after steps 202, 204, 206, and/or 208 the position of the second bracket 42 on the upper portion 32 of the door 20 can be adjusted by virtue of the apertures 74 to facilitate alignment and/or positioning of the pivot pin 46 within the slot 48 and/or channel 80.

The mounting assembly 30 of the present disclosure provides additional advantages in that the mounting assembly 30 is suitable for use in configurations in which access from above is limited during manufacturing of the home appliance. For example, as illustrated with respect to the exemplary embodiment of the cooking oven 10 shown in FIG. 6, the cooktop 50 is already assembled on the cabinet 12 and thus the mounting assembly 30 cannot be assembled from above. The mounting assembly 30 is configured such that the third bracket 90 is coupled to the second bracket 42 from a lateral side thereof and thus mounting and coupling the upper portion 32 of the door 20 with the cabinet 12 can be completed with side access, without needing to access the components from above.

While aspects of the present disclosure are described in the context of the first bracket 40 being mounted to the cabinet 12 and the second bracket 42 being mounted to the door 20, it is also within the scope of the present disclosure for the positions of the first and second brackets 40 and 42 to be reversed. For example, the first bracket 40 can be mounted to the upper portion 32 of the door 20 such that the pivot pin 46 projects upward from the upper portion 32 of the door 20 and the second bracket 42 can be mounted to the cabinet 12. In this scenario, the mounting assembly 30 operates in a manner similar to that described above with respect to FIGS. 1-11, except that the door 20 is moved during assembly to insert the pivot pin 46 into the slot 48 to hook the pivot pin 46 within the slot 48, rather than moving the slot 48 toward the pivot pin 46, as described above with respect to the exemplary embodiments of FIGS. 6-11. The third bracket 90 can be coupled with the second bracket 42 in a manner similar to that described above to prevent the pivot pin 46 from being withdrawn through the slot 48. In addition, while aspects of the present disclosure are discussed in the context of a door 20 that pivots to the right of the home appliance 10 during opening of the door 20, it is understood that the aspects of the present disclosure can be used in a similar manner in the context of a door 20 configured to pivot to the left of the home appliance 10 during opening of the door 20.

Additional embodiments of the present disclosure include:

According to a first aspect of the present disclosure, a home appliance includes: a cabinet defining an interior and having an access opening to a chamber disposed within the interior; a door coupled with the cabinet to selectively provide access to the chamber; a lower hinge assembly moveably coupling a lower portion of the door with the cabinet for movement of the door about a vertical axis between open and closed positions; and a mounting assembly configured to support an upper portion of the door relative to the cabinet until the upper portion of the door is coupled with the cabinet, including: a first bracket coupled with one of the cabinet and the door and supporting a pivot pin; and a second bracket mounted to the other of the cabinet and the door, wherein the second bracket includes a slot configured to receive the pivot pin therein; wherein, when the lower portion of the door is coupled to the cabinet by the lower hinge assembly and the pivot pin is received within the slot, the mounting assembly is configured to maintain the upper portion of the door in vertical alignment with the lower portion along the vertical axis until the upper portion of the door is coupled with the cabinet.

In a second aspect of the present disclosure, the home appliance according to the first aspect, further includes: a third bracket coupled with the second bracket to couple the upper portion of the door with the cabinet, wherein the third bracket is configured to prevent the pivot pin from being withdrawn from the slot.

In a third aspect of the present disclosure, the home appliance of according to the second aspect, wherein the coupled second and third brackets are configured to allow for relative rotation of the second and third brackets and the pivot pin, and wherein the second and third brackets moveably couple the upper portion of the door with the cabinet for movement of the door between the open and closed positions.

In a fourth aspect of the present disclosure, the home appliance according to any one of the first to the third aspects, wherein the second bracket includes a first portion coupling the second bracket to the other of the cabinet and the door and a second portion, connected to the first portion, and including the slot.

In a fifth aspect of the present disclosure, the home appliance according to the fourth aspect, wherein the second portion is vertically offset from the first portion.

In a sixth aspect of the present disclosure, the home appliance according to the fourth aspect, further including: a third portion downwardly depending from the second portion of the second bracket and adjacent the slot; and a third bracket having a first leg coupling the third bracket to the third portion, and a second leg extending from a distal end of the first leg and projecting at least partially into the slot, and wherein the second leg prevents the pivot pin from being withdrawn from the slot.

In a seventh aspect of the present disclosure, the home appliance according to the sixth aspect, wherein the second portion includes a channel extending orthogonal to the slot, and wherein the second leg traps the pivot pin within the channel.

In an eighth aspect of the present disclosure, the home appliance according to the sixth aspect, wherein the third bracket includes a third leg extending from a distal end of the first leg, opposite the second leg, and wherein the third portion is received between the first leg and the third leg.

In a ninth aspect of the present disclosure, the home appliance according to any one of the first to the eighth aspects, wherein the second bracket further includes a channel extending orthogonal to the slot, and wherein the channel is configured to receive the pivot pin therein for rotation of the door about the pivot pin when the upper portion of the door is coupled with the cabinet.

In a tenth aspect of the present disclosure, the home appliance according to any one of the first to the ninth aspects, wherein the first bracket includes a first portion coupled with one of the cabinet and the door and a second portion projecting from a distal end of the first portion, the second portion supporting the pivot pin in alignment with the vertical axis.

In an eleventh aspect of the present disclosure, the home appliance according to any one of the first to the tenth aspects, wherein the first bracket is coupled with the cabinet and the second bracket is coupled with the upper portion of the door.

According to a twelfth aspect of the present disclosure, a method of coupling a door to a home appliance for movement about a vertical axis between open and closed positions, including: connecting a lower portion of a door to a cabinet of the home appliance with a lower hinge assembly, and wherein one of the cabinet and the upper portion of the door includes a first bracket supporting a pivot pin; aligning a second bracket coupled to the other of the cabinet and the upper portion of the door and the pivot pin; and moving the upper portion of the door with respect to the cabinet to position the pivot pin within a slot formed in the second bracket; wherein, the second bracket is configured such that when the pivot pin is positioned within the slot, the upper portion of the door is maintained in vertical alignment with the lower portion of the door until the upper portion of the door is coupled with the cabinet.

In a thirteenth aspect of present disclosure, the method according to the twelfth aspect, further including: after the step of moving the upper portion of the door with respect to the cabinet to position the pivot pin within the slot, coupling the upper portion of the door with the cabinet by coupling a third bracket with the second bracket, wherein the third bracket is configured to prevent the pivot pin from being withdrawn from the slot.

In a fourteenth aspect of present disclosure, the method according to the thirteenth aspect, wherein the coupled second and third brackets are configured to allow for relative rotation of the second and third brackets with the pivot pin, and wherein the second and third brackets moveably couple the upper portion of the door with the cabinet for movement of the door between the open and closed positions.

In a fifteenth aspect of present disclosure, the method according to any one of the twelfth to fourteenth aspects, wherein the first bracket is coupled with the cabinet, the method further including: prior to the step of aligning the second bracket, coupling a first portion of the second bracket to the upper portion of the door such that a second portion, connected with the first portion and including the slot, is positioned adjacent an edge of the upper portion of the door.

In a sixteenth aspect of present disclosure, the method according to the fifteenth aspect, further including: adjusting the position of the first portion relative to the door to facilitate aligning the slot with the pivot pin.

In a seventeenth aspect of present disclosure, the method according to the fifteenth aspect, wherein the second bracket includes a third portion, downwardly depending from the second portion, the method further including: after the step of moving the upper portion of the door with respect to the cabinet to position the pivot pin within the slot, coupling a third bracket to the third portion, wherein the third bracket includes a portion that projects at least partially into the slot and prevents the pivot pin from being withdrawn from the slot.

In an eighteenth aspect of present disclosure, the method according to the seventeenth aspect, wherein the second portion includes a channel extending orthogonal to the slot, the method further including trapping the pivot pin within the channel with the portion of the third bracket projecting at least partially into the slot.

In a nineteenth aspect of present disclosure, the method according to any one of the twelfth to eighteenth aspects, wherein the second bracket includes a channel extending orthogonal to the slot, the method further including: after the step of moving the upper portion of the door with respect to the pivot pin to position the pivot pin within the slot, moving the upper portion of the door longitudinally with respect to the cabinet to position the pivot pin within the channel.

In an twentieth aspect of present disclosure, the method according to the nineteenth aspect, further including: after the step of moving the upper portion of the door longitudinally with respect to the cabinet to position the pivot pin within the channel, coupling a third bracket with the second bracket, wherein the third bracket is configured to trap the pivot pin within the channel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A home appliance, comprising:
   a cabinet defining an interior and having an access opening to a chamber disposed within the interior;
   a door coupled with the cabinet to selectively provide access to the chamber;
   a lower hinge assembly moveably coupling a lower portion of the door with the cabinet for movement of the door about a vertical axis between open and closed positions; and
   a mounting assembly configured to support an upper portion of the door relative to the cabinet until the upper portion of the door is coupled with the cabinet, comprising:
      a first bracket coupled with one of the cabinet and the door and supporting a pivot pin; and
      a second bracket mounted to the other of the cabinet and the door, wherein the second bracket includes a slot configured to receive the pivot pin therein, wherein the second bracket further comprises a channel extending orthogonal to the slot, and wherein the channel is configured to receive the pivot pin therein for rotation of the door about the pivot pin when the upper portion of the door is coupled with the cabinet;
   wherein, when the lower portion of the door is coupled to the cabinet by the lower hinge assembly and the pivot pin is received within the slot, the mounting assembly is configured to maintain the upper portion of the door in vertical alignment with the lower portion along the vertical axis until the upper portion of the door is coupled with the cabinet.

2. The home appliance of claim 1, further comprising:
   a third bracket coupled with the second bracket to couple the upper portion of the door with the cabinet, wherein the third bracket is configured to prevent the pivot pin from being withdrawn from the slot.

3. The home appliance of claim 2, wherein the coupled second and third brackets are configured to allow for relative rotation of the second and third brackets and the pivot pin, and wherein the second and third brackets moveably couple the upper portion of the door with the cabinet for movement of the door between the open and closed positions.

4. The home appliance of claim 1, wherein the second bracket comprises a first portion coupling the second bracket to the other of the cabinet and the door and a second portion, connected to the first portion, and comprising the slot.

5. The home appliance of claim 4, wherein the second portion is vertically offset from the first portion.

6. The home appliance of claim 4, further comprising:
   a third portion downwardly depending from the second portion of the second bracket and adjacent the slot; and
   a third bracket having a first leg coupling the third bracket to the third portion, and a second leg extending from a distal end of the first leg and projecting at least partially into the slot, and
   wherein the second leg prevents the pivot pin from being withdrawn from the slot.

7. The home appliance of claim 6, wherein the second portion comprises a channel extending orthogonal to the slot, and wherein the second leg traps the pivot pin within the channel.

8. The home appliance of claim 6, wherein the third bracket comprises a third leg extending from a distal end of the first leg, opposite the second leg, and wherein the third portion is received between the first leg and the third leg.

9. The home appliance of claim 1, wherein the first bracket comprises a first portion coupled with one of the cabinet and the door and a second portion projecting from a distal end of the first portion, the second portion supporting the pivot pin in alignment with the vertical axis.

10. The home appliance of claim 1, wherein the first bracket is coupled with the cabinet and the second bracket is coupled with the upper portion of the door.

11. A method of coupling a door to a home appliance for movement about a vertical axis between open and closed positions, comprising:
   connecting a lower portion of a door to a cabinet of the home appliance with a lower hinge assembly, and wherein one of the cabinet and the upper portion of the door comprises a first bracket supporting a pivot pin;
   aligning a second bracket coupled to the other of the cabinet and the upper portion of the door and the pivot pin; and
   moving the upper portion of the door with respect to the cabinet to position the pivot pin within a slot formed in the second bracket, wherein the second bracket comprises a channel extending orthogonal to the slot;
   moving the upper portion of the door longitudinally with respect to the cabinet to position the pivot pin within the channel, wherein, the second bracket is configured such that when the pivot pin is positioned within the slot, the upper portion of the door is maintained in vertical alignment with the lower portion of the door until the upper portion of the door is coupled with the cabinet.

12. The method of claim 11, further comprising:
after the step of moving the upper portion of the door with respect to the cabinet to position the pivot pin within the slot, coupling the upper portion of the door with the cabinet by coupling a third bracket with the second bracket, wherein the third bracket is configured to prevent the pivot pin from being withdrawn from the slot.

13. The method of claim 12, wherein the coupled second and third brackets are configured to allow for relative rotation of the second and third brackets with the pivot pin, and wherein the second and third brackets moveably couple the upper portion of the door with the cabinet for movement of the door between the open and closed positions.

14. The method of claim 11, wherein the first bracket is coupled with the cabinet, the method further comprising:
prior to the step of aligning the second bracket, coupling a first portion of the second bracket to the upper portion of the door such that a second portion, connected with the first portion and comprising the slot, is positioned adjacent an edge of the upper portion of the door.

15. The method of claim 14, further comprising:
adjusting the position of the first portion relative to the door to facilitate aligning the slot with the pivot pin.

16. The method of claim 14, wherein the second bracket comprises a third portion, downwardly depending from the second portion, the method further comprising:
after the step of moving the upper portion of the door with respect to the cabinet to position the pivot pin within the slot, coupling a third bracket to the third portion, wherein the third bracket comprises a portion that projects at least partially into the slot and prevents the pivot pin from being withdrawn from the slot.

17. The method of claim 16, wherein the second portion comprises a channel extending orthogonal to the slot, the method further comprising trapping the pivot pin within the channel with the portion of the third bracket projecting at least partially into the slot.

18. The method of claim 11, further comprising:
after the step of moving the upper portion of the door longitudinally with respect to the cabinet to position the pivot pin within the channel, coupling a third bracket with the second bracket, wherein the third bracket is configured to trap the pivot pin within the channel.

* * * * *